(12) United States Patent
Wang et al.

(10) Patent No.: US 12,404,917 B2
(45) Date of Patent: Sep. 2, 2025

(54) TOOTHED PORTIONS ENGAGEMENT ADAPTATION MECHANISM AND LOGISTICS SYSTEM

(71) Applicant: BEIJING JINGDONG QIANSHI TECHNOLOGY CO., LTD., Beijing (CN)

(72) Inventors: Xianwang Wang, Beijing (CN); Mingfu Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 549 days.

(21) Appl. No.: 17/997,043

(22) PCT Filed: Apr. 16, 2021

(86) PCT No.: PCT/CN2021/087624
§ 371 (c)(1),
(2) Date: Oct. 25, 2022

(87) PCT Pub. No.: WO2021/218654
PCT Pub. Date: Nov. 4, 2021

(65) Prior Publication Data
US 2023/0193985 A1 Jun. 22, 2023

(30) Foreign Application Priority Data
Apr. 27, 2020 (CN) .......................... 202010346293.4

(51) Int. Cl.
*F16H 19/04* (2006.01)
(52) U.S. Cl.
CPC ....... *F16H 19/04* (2013.01); *F16H 2019/046* (2013.01)

(58) Field of Classification Search
CPC ......... E01B 25/02; E01B 25/04; B61C 11/04; F16H 55/26; F16H 2055/0866; F16H 2019/046; F16H 19/04
(Continued)

(56) References Cited

U.S. PATENT DOCUMENTS

| 848,442 | A | * | 3/1907 | Carr et al. | .............. A47L 15/06 |
| | | | | | 295/4 |
| 2,046,661 | A | * | 7/1936 | Strauss | ................... B61B 13/02 |
| | | | | | 238/123 |

(Continued)

FOREIGN PATENT DOCUMENTS

| CN | 103671831 A | * | 3/2014 | ............. F16H 19/04 |
| CN | 107143628 A | | 9/2017 | |

(Continued)

OTHER PUBLICATIONS

"International Search Report and Written Opinion of the International Searching Authority with English language translation", International Application No. PCT/CN2021/087624, Jul. 5, 2021, 18 pp.

(Continued)

*Primary Examiner* — Paul N Dickson
*Assistant Examiner* — Maxwell L Meshaka
(74) *Attorney, Agent, or Firm* — Myers Bigel, P.A.

(57) ABSTRACT

The present disclosure relates to a toothed portions engagement adaptation mechanism and a logistics system. The toothed portions engagement adaptation mechanism includes: a rack including a first side and a second side arranged opposite to each other; a first guide tooth provided on the first side; a second guide tooth movably provided on the first side, the second guide tooth being farther than the first guide tooth from the second side; and a gear configured to partially engage the rack from the first side, and move (Continued)

towards the second side so as to completely engage the rack, wherein at least one of the first guide tooth and the second guide tooth is configured to engage the gear during the movement of the gear from the first side toward the second side.

18 Claims, 4 Drawing Sheets

(58) Field of Classification Search
USPC .......................................................... 238/123
See application file for complete search history.

(56) References Cited

U.S. PATENT DOCUMENTS

| | | | | |
|---|---|---|---|---|
| 5,582,070 | A * | 12/1996 | Dominguez | ............ F16H 55/26 74/411 |
| 8,851,226 | B2 * | 10/2014 | Culver | .................... B62D 1/265 180/428 |
| 10,562,411 | B2 * | 2/2020 | Higuchi | ..................... F16H 1/20 |
| 10,940,717 | B2 * | 3/2021 | Marshall | ................ F16H 19/043 |
| 2013/0255531 | A1 * | 10/2013 | Culver | .................... F16H 19/04 105/157.1 |
| 2018/0334054 | A1 * | 11/2018 | Higuchi | ............. B60N 2/02246 |
| 2020/0189317 | A1 * | 6/2020 | Marshall | .................. F16H 19/04 |
| 2023/0193985 | A1 * | 6/2023 | Wang | ...................... F16H 19/04 |
| 2024/0059346 | A1 * | 2/2024 | Kim | ..................... B62D 5/0454 |

FOREIGN PATENT DOCUMENTS

| | | | | |
|---|---|---|---|---|
| CN | 107218365 | A * | 9/2017 | ............. F16H 55/26 |
| CN | 107477107 | A * | 12/2017 | ............. F16H 19/04 |
| CN | 107882941 | A * | 4/2018 | ............. F16H 19/04 |
| CN | 207297743 | U | 5/2018 | |
| CN | 208719283 | U | 4/2019 | |
| CN | 110439978 | A * | 11/2019 | ............. F16H 19/04 |
| CN | 111776641 | A | 10/2020 | |
| DE | 3114756 | C1 * | 11/1982 | |
| EP | 3527849 | A1 | 8/2019 | |
| JP | 2000055170 | A | 2/2000 | |
| JP | 2006038190 | A | 2/2006 | |
| KR | 20060131590 | A | 12/2006 | |
| KR | 101991727 | B1 * | 6/2019 | ............... B62D 6/02 |

OTHER PUBLICATIONS

Decision to Grant a Patent and English language translation, JP Application No. 2022-565670, Mar. 4, 2025, 5 pp.
"Communication with Supplementary European Search Report", EP Application No. 21796377.6, Mar. 1, 2024, 8 pp.

* cited by examiner

TOOTHED PORTIONS ENGAGEMENT ADAPTATION MECHANISM AND LOGISTICS SYSTEM

CROSS-REFERENCE TO RELATED APPLICATIONS

This disclosure is a U.S. National Stage Application under 35 U.S.C. § 371 of International Patent Application No. PCT/CN2021/087624, filed on Apr. 16, 2021, which is based on and claims priority to CN Application No. 202010346293.4, filed on Apr. 27, 2020, the disclosures of which are hereby incorporated by reference in their entirety.

TECHNICAL FIELD

The present disclosure relates to the field of mechanical transmission, and in particular to a toothed portions engagement adaptation mechanism and a logistics system.

BACKGROUND

In a logistics system, a logistics vehicle needs to frequently switch from horizontal motion to vertical climbing motion. The logistics vehicle generally climbs along a rack by engagement between a gear and the rack. In the process of guiding the gear into the rack, there is a phenomenon that the gear abuts against a side of the rack and cannot move axially, which leads to a failure of axial guiding of the gear into the rack, causing a system failure and affecting the operation efficiency of the whole system.

SUMMARY

In some embodiments of the present disclosure, a toothed portions engagement adaptation mechanism is provided, which includes:
  a rack including a first side and a second side arranged opposite to each other;
  a first guide tooth provided on the first side;
  a second guide tooth movably provided on the first side, the second guide tooth being farther than the first guide tooth from the second side; and
  a gear configured to partially engage the rack from the first side, and move towards the second side so as to completely engage the rack,
  wherein at least one of the first guide tooth and the second guide tooth is configured to engage the gear during the movement of the gear from the first side toward the second side.

In some embodiments, the second guide tooth is configured to move towards the second side under an action of an external force.

In some embodiments, the toothed portions engagement adaptation mechanism further includes a mounting member, the mounting member being movably provided on the first side, and the second guide tooth being provided on the mounting member.

In some embodiments, the toothed portions engagement adaptation mechanism further includes an elastic element provided between the mounting member and the first side.

In some embodiments, the toothed portions engagement adaptation mechanism further includes a first shaft, the first shaft connecting the mounting member and the rack, the first shaft extending parallel to a connecting line between the first side and the second side, the mounting member being configured to translate relative to the rack.

In some embodiments, the first side is provided with a first recess, the first recess being recessed towards the second side, the mounting member being arranged in the first recess, and the mounting member including an outer side flush with the first side.

In some embodiments, the first guide tooth is provided in the first recess, and the mounting member is provided with an avoidance portion for avoiding the first guide tooth.

In some embodiments, the toothed portions engagement adaptation mechanism further includes a second shaft, the second shaft connecting the mounting member and the rack, the second shaft extending in a direction perpendicular to a connecting line between the first side and the second side, the mounting member being configured to swing relative to the rack.

In some embodiments, the first side is provided with a second recess, and the mounting member includes a first mounting portion and a second mounting portion, the first mounting portion being arranged in the second recess and the second guide tooth being arranged in the first mounting portion, the second shaft connecting the second mounting portion and the rack.

In some embodiments, a back face of the rack is provided with a third recess, the third recess being communicated with the second recess, the second mounting portion being arranged in the third recess, the mounting member including outer sides flush with the back face and the first side of the rack.

In some embodiments, the first guide tooth and the second guide tooth are respectively located on two sides of a central axis of the gear.

In some embodiments, there is a first distance between the farthest part of the first guide tooth from the second side and the farthest part of the second guide tooth from the second side, and the second guide tooth is configured to move towards the second side under an action of an external force, a maximum distance of the movement being a second distance, the second distance being greater than the first distance.

In some embodiments, a side of the first guide tooth away from the second side is configured as a first pointed shape portion, and a side of the second guide tooth away from the second side is configured as a second pointed shape portion, the first pointed shape portion and the second pointed shape portion both extending far away from the second side, and a part of the gear for initial engagement with the rack being configured as a third pointed shape portion, the first pointed shape portion and the second pointed shape portion being both adapted to the third pointed shape portion.

In some embodiments, the first pointed shape portion includes a first bevel face, a second bevel face and a first end face, the first end face formed at a junction between the first bevel face and the second bevel facer; and
  the second pointed shape portion includes a third bevel face, a fourth bevel face and a second end face, the second end face formed at a junction between the third bevel face and the fourth bevel face.

In some embodiments, the rack is provided with two or more first teeth along a lengthwise extending direction, the first guide teeth being provided on a side end face of one of the two or more first teeth.

In some embodiments, the rack is provided with two or more first teeth along a lengthwise extending direction, a top of the first guide tooth and a top of the second guide tooth being both flush with tops of the two or more first teeth.

In some embodiments of the present disclosure, a logistics system is provided, which includes a logistics vehicle, a frame and the toothed portions engagement adaptation mechanism described above, wherein the gear of the toothed portions engagement adaptation mechanism is provided on the logistics vehicle, and the rack of the toothed portions engagement adaptation mechanism is provided on the frame, and the logistics vehicle is configured to move along the rack by engagement of the gear and the rack.

In some embodiments, the logistics system further includes a third shaft and a power mechanism provided on the logistics vehicle, wherein the third shaft connects the power mechanism and the gear, and the power mechanism is configured to drive the gear to move from the first side towards the second side of the rack.

Based on the above technical solutions, the present disclosure has at least the following beneficial effects:

In some embodiments, both the first guide tooth and the second guide tooth are provided, and when the gear initially engages the rack, the second guide tooth is closer than the first guide tooth to the gear, and the second guide tooth can move relative to the rack, and the first guide tooth and the second guide tooth cooperate with each other to alleviate various disadvantage factors for guiding the gear into the rack and facilitate successful guiding of the gear into the rack at all angles to engage the rack.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

DETAILED DESCRIPTION OF THE EMBODIMENTS

Technical solutions in the embodiments will be described below clearly and completely in conjunction with the accompanying drawings in the embodiments of the present disclosure. Obviously, the described embodiments are only part of, instead of all of embodiments of the present disclosure. Based on the embodiments of the present disclosure, all of other embodiments obtained by a person of ordinary skill in the art without creative work should fall into the protection scope of the present disclosure.

In description of the present disclosure, it needs to be appreciated that orientation or position relations denoted by the terms "center", "longitudinal", "transverse", "front", "rear", "left", "right", "vertical", "horizontal", "top', "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

A gear is provided on a logistics vehicle, and a rack is provided on a frame, and the logistics vehicle moves along the rack by engagement of the gear and the rack. During guiding of the gear on the logistics vehicle into the rack, there is a great possibility that a tooth end face on the gear is staggered with a tooth end face on the rack, and when the gear is axially pushed into the rack, a tooth on the gear engages a tooth on the rack and rotates by a certain angle, thus achieving successful engagement of the gear and the rack. However, there is also a situation where the tooth end face on the gear is just aligned with the tooth end face on the rack, and the gear abuts against a side of the rack and cannot move axially, resulting in a failure of axial guiding of the gear into the rack.

Based on this, in some embodiments of the present disclosure, a toothed portions engagement adaptation mechanism is provided to alleviate the problem of the failure of axial guiding of the gear into the rack.

Figure 1:
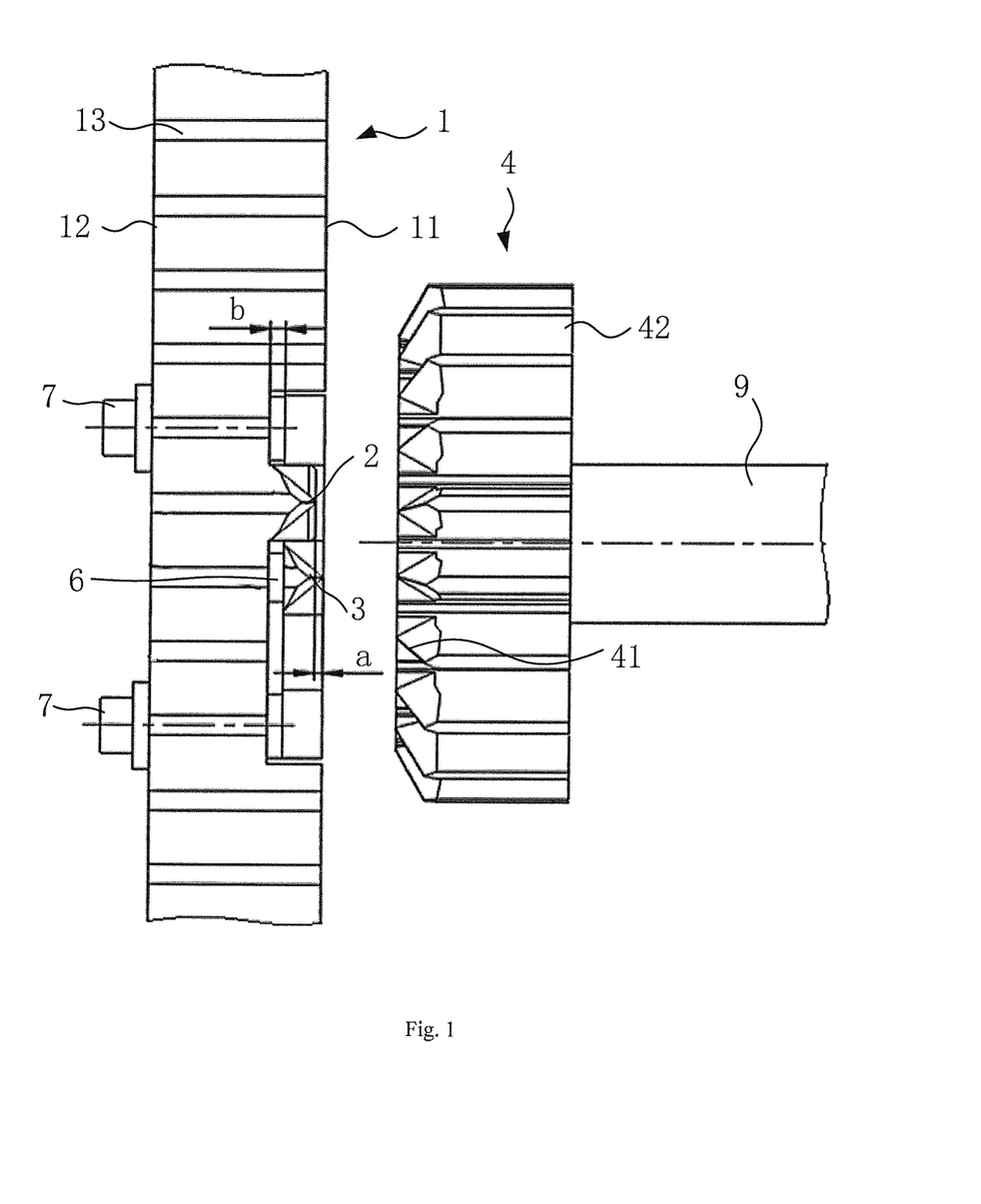
FIG. 1 is a schematic diagram of a toothed portions engagement adaptation mechanism provided according to some embodiments of the present disclosure.

As shown in FIG. 1, in some embodiments, the toothed portions engagement adaptation mechanism includes a rack 1, a first guide tooth 2, a second guide tooth 3, and a gear 4.

The rack 1 includes a first side 11 and a second side 12 arranged opposite to each other. A front face of the rack 1 is provided with two or more first teeth 13 along a lengthwise extending direction of the rack 1, and a face opposite to the front face of the rack 1 is a back face 14 of the rack 1. A direction between the first side 11 and the second side 12 is an extending direction of each first teeth 13 of the two or more first teeth 13.

The first guide tooth 2 is provided on the first side 11 of the rack 1.

The second guide tooth 3 is movably provided on the first side 11 of the rack 1, and the second guide tooth 3 is farther than the first guide tooth 2 from the second side 12.

The gear 4 is circumferentially provided with two or more second teeth 42. The second teeth 42 are configured to engage the first teeth 13 on the rack 1. The gear 4 is configured to initially engage the rack 1 from the first side 11, move towards the second side 12 and further engage the rack 1, so as to completely engage the rack 1.

At least one of the first guide tooth 2 and the second guide tooth 3 is configured to engage the gear 4 during the movement of the gear 4 from the first side 11 toward the second side 12.

Figure 5:
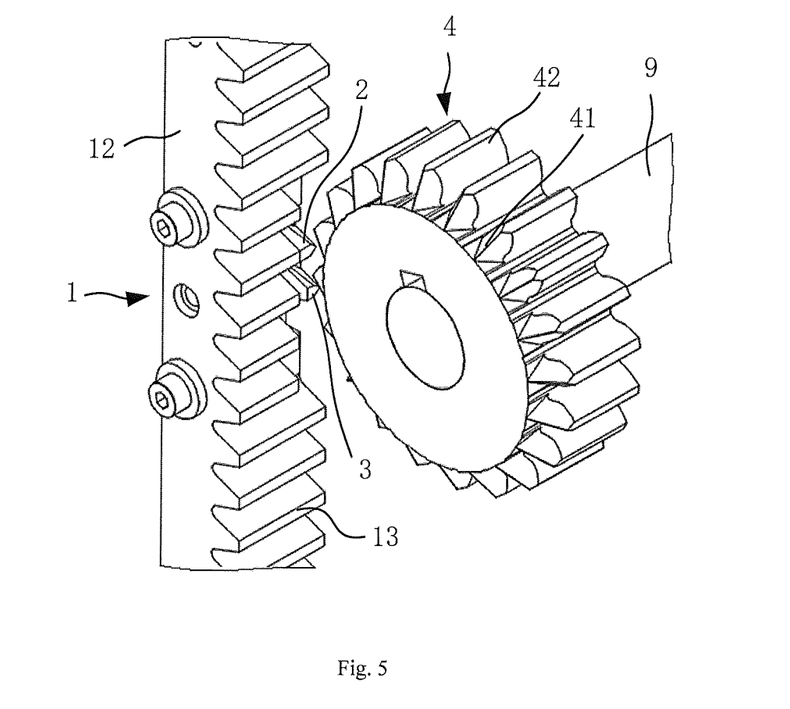
FIG. 5 is a schematic diagram of initial engagement between a gear and a first side of a rack provided according to some embodiments of the present disclosure.

In some embodiments, as shown in FIG. 5, during guiding of the gear 4 into the rack 1, there are the following situations when the gear 4 initially engages the rack 1 from the first side 1 of the rack 1.

If an end face of one of the second teeth 42 on the gear 4 is located between an end face of the second guide tooth 3 and an end face of the first guide tooth 2, as the second guide tooth 3 is farther than the first guide tooth 2 from the second side 12, the second guide tooth 3 comes into contact with the gear 4 first, and the gear 4 rotates, under an action of the second guide tooth 3, to a position of correct engagement with the rack 1, thus correctly guiding the gear 4 into the rack 1.

If the end face of one of the second teeth 42 on the gear 4 is aligned with the end face of the second guide tooth 3, such that the gear 4 abuts against the second guide tooth 3 and cannot rotate, as an axial force on the gear 4 increases, the second guide tooth 3 moves, under force, relative to the first side 11, and when the end face of the second guide tooth 3 is farther than the end face of the first guide tooth 2 from the gear 4, the end face of the first guide tooth 2 starts to approach an end face of another second tooth 42 on the gear 4, and turns the gear 4 by a certain angle after contact, such that the gear 4 rotates to a position of correct engagement with the rack 1, thus correctly guiding the gear 4 into the rack 1.

If the end face of one of the second teeth 42 on the gear 4 is aligned with the end face of the first guide tooth 2, since the second guide tooth 3 comes into contact with the gear 4 earlier than the first guide tooth 2, and the end face of the second guide tooth 3 is not aligned with an end face of another corresponding second tooth 42 on the gear 4 due to a geometric relationship, the second guide tooth 3 can still turn the gear 4 by a certain angle, such that the gear 4 rotates to a position of correct engagement with the rack 1, thus correctly guiding the gear 4 into the rack 1.

Therefore, in some embodiments provided in the present disclosure, both the first guide tooth 2 and the second guide tooth 3 are provided, and the first guide tooth 2 and the second guide tooth 3 cooperate with each other to alleviate various disadvantage factors for guiding the gear 4 into the rack 1 and facilitate successful guiding of the gear 4 into the rack 1 at all angles to engage the rack 1.

In some embodiments, the first guide tooth 2 and the second guide tooth 3 are respectively located two sides of a central axis of the gear 4.

Optionally, the first guide tooth 2 is located above the central axis of the gear 4, and the second guide tooth 3 is located below the central axis of the gear 4. Alternatively, the first guide tooth 2 is located below the central axis of the gear 4, and the second guide tooth 3 is located above the central axis of the gear 4.

In some embodiments, the second guide tooth 3 is adjacent to the first guide tooth 2.

In some embodiments, the second guide tooth 3 is configured to move towards the second side 12 under an action of an external force.

In some embodiments, there is a first distance a between the farthest part of the first guide tooth 2 from the second side 12 and the farthest part of the second guide tooth 3 from the second side 12, and the second guide tooth 3 is configured to move towards the second side 12 under the action of an external force, a maximum distance of the movement being a second distance b, the second distance b being greater than the first distance a.

When the end face of one of the second teeth 42 on the gear 4 is aligned with the end face of the second guide tooth 3, such that the gear 4 abuts against the second guide tooth 3 and cannot rotate, as the axial force on the gear 4 increases, the second guide tooth 3 moves, under force, in the direction toward the second side 12, and since the second distance b is greater than the first distance a, thus when the second guide tooth 3 moves towards the second side 12 such that the end face of the second guide tooth 3 is farther than the end face of the first guide tooth 2 from the gear 4, the end face of the first guide tooth 2 starts to approach the end face of another second tooth 42 on the gear 4 and turns the gear 4 by a certain angle after contact, such that the gear 4 rotates to a position of correct engagement with the rack 1, thus achieving correct guiding of the gear 4 into the rack 1.

Figure 2:
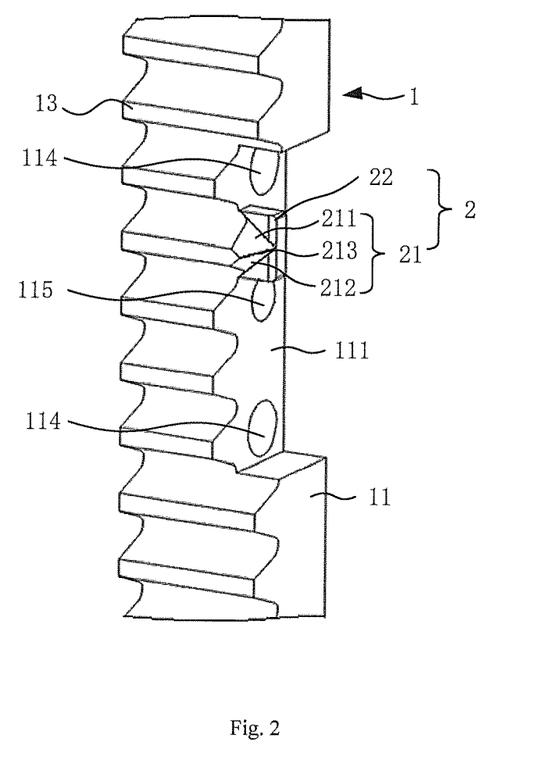
FIG. 2 is a schematic diagram of a rack and a first guide tooth provided according to some embodiments of the present disclosure.
Figure 3:
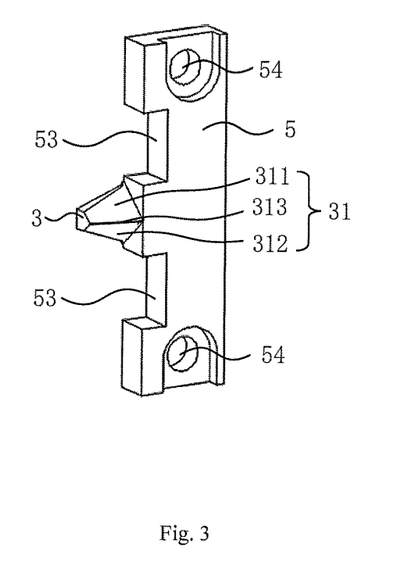
FIG. 3 is a schematic diagram of a mounting member and a second guide tooth provided according to some embodiments of the present disclosure.
Figure 4:
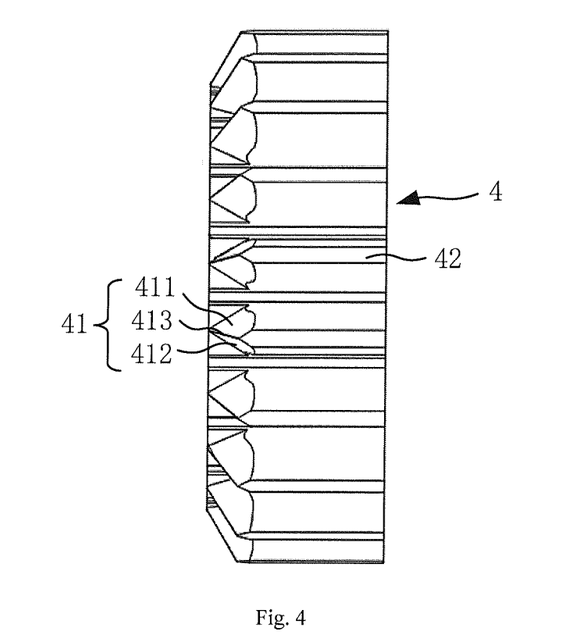
FIG. 4 is a schematic diagram of a gear provided according to some embodiments of the present disclosure.

In some embodiments, as shown in FIG. 2, a side of the first guide tooth 2 away from the second side 12 is configured as a first pointed shape portion 21. As shown in FIG. 3, a side of the second guide tooth 3 away from the second side 12 is configured as a second pointed shape portion 31. The first pointed shape portion 21 and the second pointed shape portion 31 both extend away from the second side 12. As shown in FIG. 4, a part of the gear 4 for initial engagement with the rack 1 is configured as a third pointed shape portion 41, the first pointed shape portion 21 and the second pointed shape portion 31 being both adapted to the third pointed shape portion 41.

As shown in FIG. 4, the tooth end face of each second tooth 42 of the two or more second teeth 42 circumferentially provided on the gear 4 is provided with a third pointed shape portion 41.

During guiding of the gear 4 into engagement with the rack 1, at least one of the first pointed shape portion 21 and the second pointed shape portion 31 is engaged with and guided to the third pointed shape portion 41, and the gear 4 can passively rotate without power. In the process where the gear 4 axially approaches the rack 1 and is guided into the rack 1, the gear 4 is axially pushed into the rack 1, and the gear 4 passively rotates by a certain angle under the action of bevel faces of the first pointed shape portion 21 and the second pointed shape portion 31, thus achieving correct engagement of the gear 4 and the rack 1.

When the third pointed shape portion 41 of the gear 4 is just aligned with the first pointed shape portion 21 or the second pointed shape portion 31, and the gear 4 abuts against the side of the rack 1 and cannot move axially, the first guide tooth 2 and the second guide tooth 3 cooperate to overcome disadvantage factors for guiding the gear 4 into the rack 1 and facilitate successful guiding of the gear 4 into the rack 1 at all angles.

In some embodiments, as shown in FIG. 2, the first pointed shape portion 21 includes a first bevel face 211, a second bevel face 212 and a first end face 213, the first bevel face 211 and the second bevel face 212 being connected to the first end face 213 at an end close to each other.

The first bevel face 211 and the second bevel face 212 respectively extend from ends of two tooth faces of a first tooth 13, and extending ends of the first bevel face 211 and the second bevel face 212 are close to each other and connected to the first end face 213.

In some embodiments, as shown in FIG. 3, the second pointed shape portion 31 includes a third bevel face 311, a fourth bevel face 312 and a second end face 313, the third bevel face 311 and the fourth bevel face 312 being connected to the second end face 313 at an end close to each other.

In some embodiments, as shown in FIG. 4, the third pointed shape portion 41 includes a fifth bevel face 411, a sixth bevel face 412 and a third end face 413, the fifth bevel face 411 and the sixth bevel face 412 being connected to the third end face 413 at an end close to each other.

The fifth bevel face 411 and the sixth bevel face 412 respectively extend from ends of two tooth faces of a second tooth 42, and extending ends of the fifth bevel face 411 and the sixth bevel face 412 are close to each other and connected to the third end face 413.

FIG. 5 illustrates a relative position relationship between the gear 4 and the second guide tooth 3 and the first guide tooth 2 when the gear 4 initially engages the rack 1 from the first side 11 of the rack 1 in some embodiments.

The principle of facilitating correct guiding of the gear 4 into the rack 1 by mutual cooperation of the first guide tooth 2 and the second guide tooth 3 is as follows: the third pointed shape portion 41 on a second teeth 42 of the gear 4 does not come into contact with the second guide tooth 3 and the first guide tooth 2 at the same time, and using front-back and upper-lower spatial relationships and geometric characteristics of the gear and the rack, the corresponding teeth interact when the angle of the corresponding teeth is appropriate, without being influenced by the other teeth, and when the corresponding teeth are just aligned and the gear 4 cannot be rotated, an adjacent tooth can intervene subsequently to break the just-aligned balance state, thereby allowing the guiding to continue.

In some embodiments, the first guide tooth 2 is provided on a tooth end face of one of the first teeth 13.

In some embodiments, the top of the first guide tooth 2 and the top of the second guide tooth 3 being both flush with the tops of the first teeth 13.

In some embodiments, as shown in FIG. 3, the toothed portions engagement adaptation mechanism further includes a mounting member 5, the mounting member 5 being movably provided on the first side 11, and the second guide tooth 3 being provided on the mounting member 5.

In some embodiments, as shown in FIG. 1, the toothed portions engagement adaptation mechanism further includes an elastic element 6, the elastic element 6 is provided between the mounting member 5 and the first side 11.

The mounting member 5 is kept at a second distance b from the rack 1 under an action of the elastic element 6, that is, the second guide tooth 3 is kept at a second distance b from the rack 1 under the action of the elastic element 6.

In some embodiments, in the process where the gear 4 moves axially from the first side 11 toward the second side 12 of the rack 1 and is guided into the rack 1, there are the following situations.

If the third end face 413 of one of the third pointed shape portions 41 of the gear 4 is located between the second end face 313 of the second pointed shape portion 31 and the first end face 213 of the first pointed shape portion 21, then since the second guide tooth 3 comes into contact with the gear 4 earlier than the first guide tooth 2, the gear 4 further passively rotates to a position of correct engagement with the rack 1 under the action of the second guide tooth 3, thus achieving correct guiding of the gear 4 into the rack 1.

If the third end face 413 of one of the third pointed shape portions 41 of the gear 4 is aligned with the second end face 313 of the second pointed shape portion 31, such that the gear 4 abuts against the second guide tooth 3 and cannot rotate, as an axial force on the gear 4 increases, the second guide tooth 3 under force compresses the elastic element 6 and moves toward the second side surface 12, and when the second end face 313 of the second pointed shape portion 31 is further than the first end face 213 of the first pointed shape portion 21 from the gear 4, the first end face 213 of the first pointed shape portion 21 starts to approach the fifth bevel face 411 or the sixth bevel face 412 of another third pointed shape portion 41 on the gear 4, and turns the gear 4 by a certain angle after contact, such that the gear 4 rotates to a position of correct engagement with the rack 1, thus achieving correct guiding of the gear 4 into the rack 1.

If the third end face 413 of one of the third pointed shape portions 41 of the gear 4 is aligned with the first end face 213 of the first pointed shape portion 21, since the second guide tooth 3 comes into contact with the gear 4 earlier than the first guide tooth 2, and the second end face 313 of the second pointed shape portion 31 is not aligned with the third end face 413 of another third pointed shape portion 41 on the gear 4 due to a geometric relationship, the second guide tooth 3 can still turn the gear 4 by a certain angle, such that the gear 4 rotates to a position of correct engagement with the rack 1, thus achieving correct guiding of the gear 4 into the rack 1.

In some embodiments, as shown in FIG. 1, the toothed portions engagement adaptation mechanism includes a first shaft 7, the first shaft 7 connecting the mounting member 5 and the rack 1, the first shaft 7 extending parallel to a connecting line between the first side 11 and the second side 12, the mounting member 5 being configured to translate relative to the rack 1.

Optionally, the mounting member 5 and the first shaft 7 move simultaneously relative to the rack 1. Alternatively, the first shaft 7 does not move and the mounting member 5 moves along the first shaft 7 to move relative to the rack 1.

In some embodiments, the first side 11 is provided with a first recess 111, the first recess 111 being recessed towards the second side 12, the mounting member 5 being arranged in the first recess 111, and the mounting member 5 including an outer side flush with the first side 11.

In some embodiments, the first guide tooth 2 is provided in the first recess 111, and the mounting member 5 is provided with an avoidance portion 53 for avoiding the first guide tooth 2.

In some embodiments, the mounting member 5 is connected to the rack 1 by two first shafts 7.

As shown in FIG. 2, the first recess 111 is provided with two first holes 114, the two first holes 114 being respectively used for the two first shafts 7 to pass through, and the two first shafts 7 connect the mount 5 and the rack 1. The first recess 111 is also provided with a second hole 115, the second hole 115 being used to mount the elastic element 6.

As shown in FIG. 3, the mounting member 5 is configured as a symmetrical structure, which includes two third holes 54 and two avoidance portions 53. The two third holes 54 respectively correspond to the two first holes 114 on the rack 1, and are used for the two first shafts 7 to pass through. The two third holes 54 are respectively formed at two ends of the mounting member 5 and are symmetrical with respect to the middle of the mounting member 5. The second guide tooth 3 is provided between the two third holes 54, with one avoidance portion 53 being formed between the second guide tooth 3 and one of the third holes 54, and the other avoidance portion 53 being formed between the second guide tooth 3 and the other third hole 54, and the two avoidance portions 53 being symmetrical with respect to the middle of the mounting member 5. The mounting member 5 configured as a symmetrical structure not only can be arranged on the rack 1 on one side of the logistics vehicle, but also can be arranged on the rack 1 on the other side of the logistics vehicle.

In some embodiments, the mounting member 5 is fixedly connected to the two first shafts 7, and the two first shafts 7 respectively pass through the two first holes 114 in the rack 1, so the second guide tooth 3 and the two first shafts 7 can reciprocate together relative to the rack 1 in a direction of a connecting line of the first side 11 and the second side 12.

In some embodiments, the elastic element 6 is mounted between the first recess 111 and the mounting member 5 to provide a second distance b between the second guide tooth 3 and the first recess 111.

Figure 6:
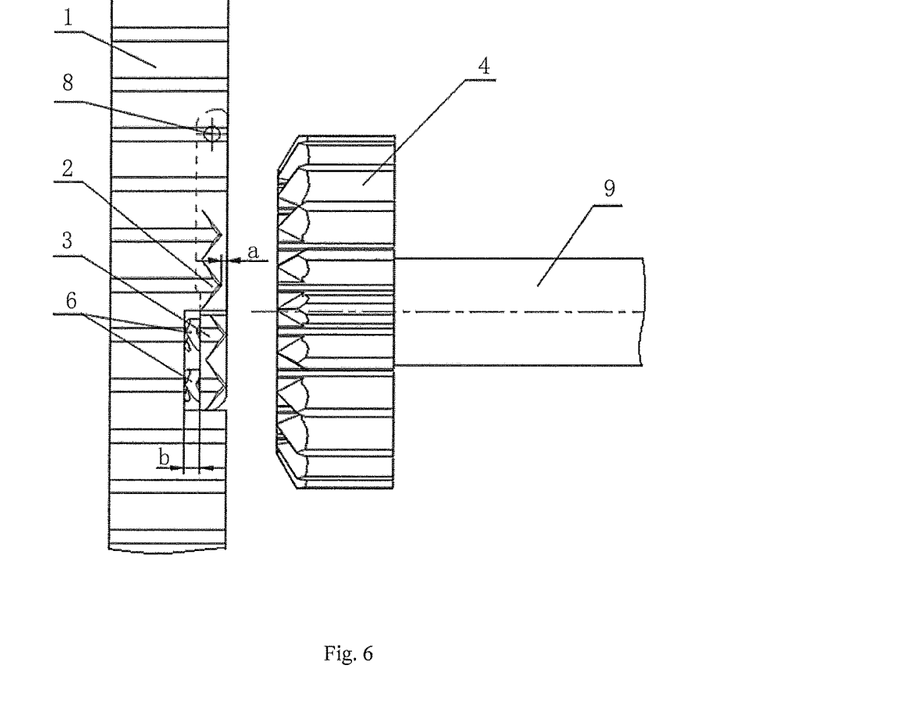
FIG. 6 is a schematic diagram of a toothed portions engagement adaptation mechanism provided according to some other embodiments of the present disclosure.

In some embodiments, as shown in FIG. 6, the toothed portions engagement adaptation mechanism includes a second shaft 8, the second shaft 8 connecting the mounting member 5 and the rack 1, the second shaft 8 extending in a direction perpendicular to a connecting line between the first side 11 and the second side 12, the mounting member 5 being configured to swing relative to the rack 1.

Optionally, the mounting member 5 is fixed to the second shaft 8, and the mounting member 5 and the second shaft 8 both swing relative to the rack 1. Alternatively, the second shaft 8 is fixed to the rack 1, and the mounting member 5 swings around the second shaft 8 relative to the rack 1.

Figure 7:
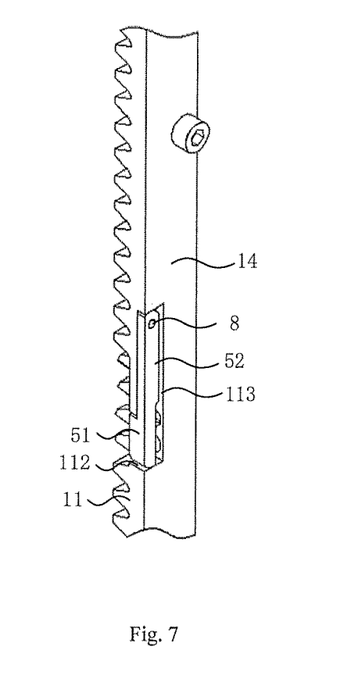
FIG. 7 is a schematic diagram of a rack and a mounting member in FIG. 6.

In some embodiments, as shown in FIG. 7, the first side 11 is provided with a second recess 112, and the mounting member 5 includes a first mounting portion 51 and a second mounting portion 52, the first mounting portion 51 being arranged in the second recess 112 and the second guide tooth 3 being arranged in the first mounting portion 51, the second shaft 8 connecting the second mounting portion 52 and the rack 1. The elastic element 6 is arranged between the first mounting portion 51 and the second recess 112.

In some embodiments, the back face 14 of the rack 1 is provided with a third recess 113, the third recess 113 being communicated with the second recess 112, the second mounting portion 52 being arranged in the third recess 113, the mounting member 5 including outer sides flush with the back face 14 and the first side 11 of the rack 1.

In some embodiments, as shown in FIGS. 6 and 7, the second mounting portion 52 of the mounting member 5 is connected to the rack 1 by the second shaft 8; the second guide tooth 3 is arranged on the first mounting portion 51 of the mounting member 5; the elastic element 6 is arranged between the second recess 112 and the first mounting portion 51 to provide a second distance b between the second guide tooth 3 and the second recess 112; and the rack 1 is machined with the first guide tooth 2, which is adjacent to the position of the second guide tooth 3, the first guide tooth and the second guide tooth being respectively located at the upper and lower sides of the axis of the gear 4 in height.

The first guide tooth 2 and the second guide tooth 3 are respectively provided with the first pointed shape portion 21 and the second pointed shape portion 31 on the side of initial engagement with the gear 4. When the third end face 413 of one of the third pointed shape portions 41 of the gear 4 is aligned with the second end face 313 of the second pointed shape portion 31, the second guide tooth 3 swings around the second shaft 8 in a direction of approaching the second side 12, and thus the first end face 213 of the first pointed shape portion 21 starts to approach the fifth bevel face 411 or the sixth bevel face 412 of another third pointed shape portion 41 on the gear 4, and turns the gear 4 by a certain angle after contact, such that the gear 4 rotates to a position of correct engagement with the rack 1, thus achieving correct guiding of the gear 4 into the rack 1.

According to the description of the above embodiments, the second guide tooth 3 may translate relative to the rack 1, and may also swing relative to the rack 1, so long as it can cause a change in the position of the second guide tooth 3 relative to the rack 1 such that the first guide tooth 2 engages the gear 4.

In some embodiments, the elastic element 6 includes a spring.

In some embodiments, a logistics system is provided, which includes a logistics vehicle, a frame and the toothed portions engagement adaptation mechanism described above, wherein the gear 4 of the toothed portions engagement adaptation mechanism is provided on the logistics vehicle, and the rack 1 of the toothed portions engagement adaptation mechanism is provided on the frame, and the logistics vehicle is configured to move along the rack 1 by engagement of the gear 4 and the rack 1.

In some embodiments, the logistics system includes the toothed portions engagement adaptation mechanism in the above embodiments, and when the logistics vehicle switches from horizontal motion to vertical motion, the gear 4 can be smoothly guided axially into the rack 1 to achieve correct engagement.

In some embodiments, the logistics system includes a third shaft 9 and a power mechanism provided on the logistics vehicle, wherein the third shaft 9 connects the power mechanism and the gear 4, and the power mechanism is configured to drive the gear 4 to move from the first side 11 towards the second side 12 of the rack 1.

In some embodiments, each logistics vehicle is equipped with two or more sets of toothed portions engagement adaptation mechanisms, and the sets of toothed portions engagement adaptation mechanisms are symmetrically distributed on the left and right sides of the logistics vehicle. The rack 1 is fixedly mounted on a climbing rail (not shown in the figures) provided on the frame.

In the description of the present disclosure, it needs to be appreciated that the use of the terms "first", "second", "third' and the like to define parts and components is only for the convenience of distinguishing the above-mentioned parts and components. Unless otherwise stated, the above terms have no special meanings, and therefore cannot be construed as limitations on the protection scope of the present disclosure.

In addition, technical features of one embodiment may be beneficially combined with one or more other embodiments, unless explicitly denied.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. A toothed portions engagement adaptation mechanism, comprising:
    a rack comprising a first side and a second side arranged opposite to each other;
    a first guide tooth arranged on the first side;
    a second guide tooth movably arranged on the first side, the second guide tooth being far away from the second side relative to the first guide tooth; and
    a gear configured to partially engage the rack from the first side, and move towards the second side so as to completely engage the rack,
    wherein at least one of the first guide tooth and the second guide tooth is configured to engage the gear during the movement of the gear from the first side toward the second side.

2. The toothed portions engagement adaptation mechanism according to claim 1, wherein the second guide tooth is configured to move towards the second side under an action of an external force.

3. The toothed portions engagement adaptation mechanism according to claim 1, further comprising a mounting member, the mounting member being movably provided on the first side, and the second guide tooth being provided on the mounting member.

4. The toothed portions engagement adaptation mechanism according to claim 3, further comprising an elastic element provided between the mounting member and the first side.

5. The toothed portions engagement adaptation mechanism according to claim 3, further comprising a first shaft, the first shaft connecting the mounting member and the rack, the first shaft extending parallel to a connecting line between the first side and the second side, the mounting member being configured to translate relative to the rack.

6. The toothed portions engagement adaptation mechanism according to claim 3, wherein the first side is provided with a first recess, the first recess being recessed towards the second side, the mounting member being arranged in the first recess, and the mounting member comprising an outer side flush with the first side.

7. The toothed portions engagement adaptation mechanism according to claim 6, wherein the first guide tooth is provided in the first recess, and the mounting member is provided with an avoidance portion for avoiding the first guide tooth.

8. The toothed portions engagement adaptation mechanism according to claim 3, further comprising a second shaft, the second shaft connecting the mounting member and the rack, the second shaft extending in a direction perpendicular to a connecting line between the first side and the second side, the mounting member being configured to swing relative to the rack.

9. The toothed portions engagement adaptation mechanism according to claim 8, wherein the first side is provided with a second recess, and the mounting member comprises a first mounting portion and a second mounting portion, the first mounting portion being arranged in the second recess and the second guide tooth being arranged in the first mounting portion, the second shaft connecting the second mounting portion and the rack.

10. The toothed portions engagement adaptation mechanism according to claim 9, wherein a back face of the rack is provided with a third recess, the third recess being communicated with the second recess, the second mounting portion being arranged in the third recess, the mounting member comprising an outer side flush with the back face and the first side of the rack.

11. The toothed portions engagement adaptation mechanism according to claim 1, wherein the first guide tooth and the second guide tooth are respectively located on two sides of a central axis of the gear.

12. The toothed portions engagement adaptation mechanism according to claim 1, wherein there is a first distance between a part of the first guide tooth farthest away from the second side and a part of the second guide tooth farthest away from the second side, and the second guide tooth is configured to move towards the second side under an action of an external force, a maximum distance of the movement being a second distance, the second distance being greater than the first distance.

13. The toothed portions engagement adaptation mechanism according to claim 1, wherein a side of the first guide tooth away from the second side is configured as a first pointed shape portion, and a side of the second guide tooth away from the second side is configured as a second pointed shape portion, the first pointed shape portion and the second pointed shape portion both extending far away from the second side, and a part of the gear for initial engagement with the rack being configured as a third pointed shape portion, the first pointed shape portion and the second pointed shape portion being both adapted to the third pointed shape portion.

14. The toothed portions engagement adaptation mechanism according to claim 13, wherein the first pointed shape portion comprises a first bevel face, a second bevel face and a first end face, the first end face formed at a junction between the first bevel face and the second bevel face; and the second pointed shape portion comprises a third bevel face, a fourth bevel face and a second end face, the second end face formed at a junction between the third bevel face and the fourth bevel face.

15. The toothed portions engagement adaptation mechanism according to claim 1, wherein the rack is provided with two or more first teeth along a lengthwise extending direction, the first guide teeth being provided on a side end face of one first teeth of the two or more first teeth.

16. The toothed portions engagement adaptation mechanism according to claim 1, wherein the rack is provided with two or more first teeth along a lengthwise extending direction, a top of the first guide tooth and a top of the second guide tooth being both flush with tops of the two or more first teeth.

17. A logistics system comprising a logistics vehicle, a frame and the toothed portions engagement adaptation mechanism of claim 1, wherein the gear of the toothed portions engagement adaptation mechanism is provided on the logistics vehicle, and the rack of the toothed portions engagement adaptation mechanism is provided on the frame, and the logistics vehicle is configured to move along the rack by engagement of the gear and the rack.

18. The logistics system according to claim 17, further comprising a third shaft and a power mechanism provided on the logistics vehicle, wherein the third shaft connects the power mechanism and the gear, and the power mechanism is configured to drive the gear to move from the first side towards the second side of the rack.

* * * * *